Jan. 20, 1931.　　　A. F. SHORE　　　1,789,845
SPRING SUPPORT FOR VEHICLES
Original Filed May 10, 1924
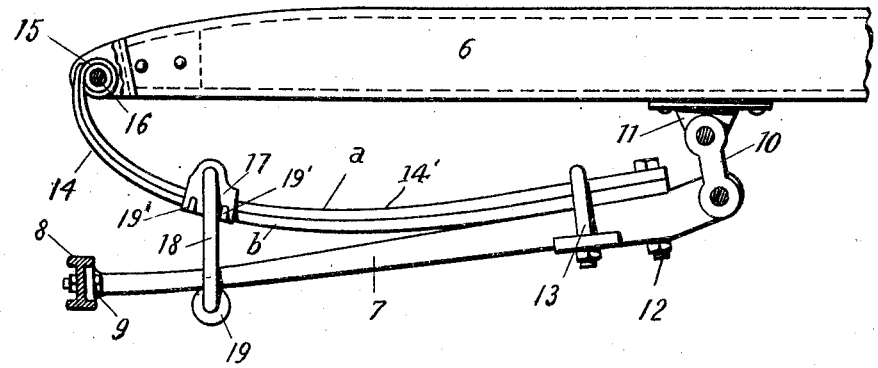
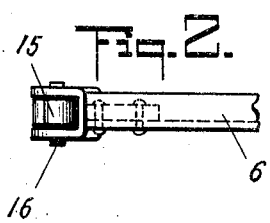
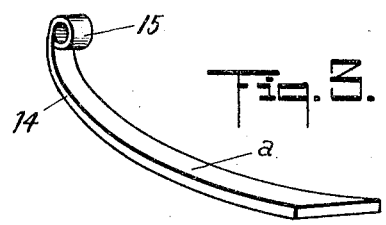
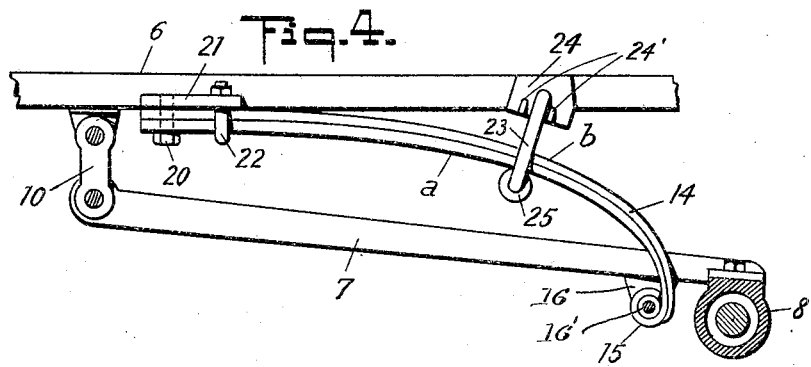
INVENTOR
Albert F. Shore
BY
ATTORNEY Patented Jan. 20, 1931

1,789,845

UNITED STATES PATENT OFFICE

ALBERT F. SHORE, OF NEW YORK, N. Y.

SPRING SUPPORT FOR VEHICLES

Refile of application Serial No. 712,219, filed May 10, 1924. This application filed March 7, 1928. Serial No. 259,835.

This invention relates to spring elements of simple construction, particularly adapted to spring suspensions for automotive vehicles, and its primary object is to so construct and arrange the spring as to mitigate and absorb to the highest degree head-on shocks due particularly to abrupt road irregularities encountered by the wheels in the movement of the vehicle. This invention constituted the subject-matter of my prior application filed May 10, 1924, Ser. No. 712,219, and unintentionally abandoned by me on January 1, 1928; and hence this application is to be regarded as a refiling of the said abandoned application.

In springs of ordinary construction, provision is made for vertical flexure, which serves all purposes when the vehicle is moving slowly; however, when the vehicle is moving rapidly, a form of spring resistance is set up which has a tendency to so stiffen leaf-springs, particularly of the semi-elliptic form, that positive shocks are communicated to the suspended body of the vehicle and to the passengers in said body, which shocks may be classed as a form of transmitted vibration similar to the vibration of a bell or piano-wire action when struck a blow and emitting a sound. This is a shortcoming and a disadvantage in the ordinary methods of spring construction, particularly semi-elliptic springs, and is caused by the flexure or flattening and hence a consequent lengthening of the spring-leaf or leaves so as to impart a certain amount of creeping motion to the axle-sets or unsprung masses in their relation to the connection of the spring to the chassis. It will thus be obvious that when an obstruction or irregularity in the roadway is encountered by the vehicle-wheels, not only does the axle move in a direction toward the chassis but a force is also exerted on the axle in a direction to move it away from its fixed connection with the chassis. Under great speed, the unsprung mass of the axle thus presents such high inertia, that, as a matter of fact, the springs can only flex with great difficulty, and, hence, direct as well as indirect horizontal or longitudinal shocks are not only transmitted to the body of the vehicle but also abnormal vertical shocks. To overcome this difficulty and disadvantage, such shocks are automatically and almost instantaneously absorbed by the spring elements of simple construction embodying my invention and covered by this application, and in which construction the spring-leaf or leaves are provided at one end or portion with a special transverse curvature having its tangent approximately at right-angles to the plane of the relatively-flat or bowed portion constituting the other end of the said spring-leaf or leaves. This transverse curvature of the spring-leaf or leaves is practically perpendicular at the fixed eye of the main or upper leaf of the spring element. The object of the vertical or perpendicular disposition of the end of the spring provided with the accentuated curvature described, is to permit longitudinal flexure of the spring as a whole when the wheel or wheels of the vehicle encounter sudden head-on shocks as a result of unusual obstructions, depressions or irregularities in the highway, or when the inertia of the axle masses is too great to allow the free transverse flexure of the relatively-flat or bowed portion constituting the other end of the spring element.

The foregoing and other objects of the invention will be fully described and claimed hereinafter and which are illustrated in the drawing accompanying and forming part of this application, and in which Figure 1 is a side elevation of an embodiment of my improved spring means applied to a special form of cantilever spring suspension which is attached to the chassis-frame of an automotive vehicle, only so much of the vehicle-frame being shown as is essential to an understanding of the invention.

Fig. 2 is a plan view of the end of the spring shown in Fig. 1, illustrating the manner of connecting same to the chassis-frame.

Fig. 3 is a perspective view of a spring-leaf constructed and arranged in accordance with the present invention; and Fig. 4 is an elevation showing another form of cantilever spring suspension provided with my invention.

In Fig. 1 of the drawing, there is shown an embodiment of my invention as applied to a special form of cantilever spring suspension construction for automotive vehicles. The frame of the vehicle is designated by 6, and only so much of the frame is shown as is necessary to a complete understanding of the invention which comprises a lever 7 fixed at one end 9 to an axle 8, the opposite end of the lever having a pivotal-link connection 10 with a bracket 11 attached to the frame in any suitable or convenient manner. A spring of quarter-elliptical form, having a main or upper leaf $a$ and an auxiliary or lower leaf $b$, is secured at one end upon the lever 7, adjacent to the link connection 10 of the lever with the frame, by a bolt 12 passing through perforations in the spring leaves $a$ and $b$ and through the lever 7, and which spring is also secured in place on the lever by a spring-clip 13 straddling the said spring leaves and lever, respectively. The free ends of the spring-leaves are curved transversely or upwardly, as indicated at 14, which curved portion has its tangent terminating approximately at right-angles to the plane of the relatively horizontal or bowed portion 14' of the spring leaves, the main or upper leaf $a$ of the spring having a fulcrum eye 15 for the engagement of a stud 16 secured in the end of the frame 6 to support said end of the spring. The free end of the auxiliary or lower leaf $b$ extends to a point beyond the center of the fulcrum eye 15 of the main leaf $a$, as clearly shown in the drawing, for the purpose of stiffening and strengthening the main leaf at that point. The leaves are relatively heavy and gradually taper both in thickness and width from their point of anchorage on the lever 7 to the ends of said leaves. Also, preferably, the main leaf $a$ is heavier than the auxiliary leaf $b$; that is, it has greater thickness but tapers proportionally both in width and thickness from the point of anchorage to its outer end. By the use of this arrangement of spring suspension, a spring having a single leaf is as strong and elastic and practical as the present commercial spring provided with a plurality of thin leaves of the same thickness and width throughout; however, as a safety factor, it is preferable to use at least a pair of spring leaves.

To prevent excessive rebounds of the spring after it has been suddenly compressed under overload, or from any other cause expected or unexpected, a bearing 17 is rigidly secured to the spring-leaves a short distance from their ends and within the curved portion 14 thereof. Said bearing pivotally supports a U-shaped link 18, which embraces the sides of the spring leaves $a$ and $b$ and the lever 7, said link being provided at its lower end with a cushioning roller 19 of rubber or any other suitable material, to engage the lower surface of the lever 7. To prevent the link 18 from swinging outwardly or inwardly too far, when the spring is suddenly compressed and for limiting its movement in this respect, lugs 19'—19' are provided on the bearing 17 and which extend laterally thereof. The roller 19 not only prevents undue shock but also overcomes any objectionable noise when coming into contact with the lever 7 in the rebound of the spring after compression.

Assuming the vehicle wheel encounters an obstruction or irregularity in the roadway and which transmits a sudden shock to the axle 8 in a direction from the left as viewed in Fig. 1 of the drawing, said shock is communicated in a direct line parallel to the lever 7. In a spring suspension system of ordinary construction, this shock would be transmitted to the frame 6 through the spring acting as a tension member. In my new and improved spring construction, this shock will be neutralized by a flexure of the upward turned or curved portion 14 of the leaf-spring. As the vehicle wheel passes over such irregularity of the roadway, a vertical or upward movement is imparted to the axle 8 and a consequent rocking of the lever 7, thereby correspondingly flexing the relatively-flat or bowed portion 14' of the spring, which causes a lengthening of the spring as a whole, which is permitted by the movement of the spring and lever through the link connection 10 of the lever with the frame 6. In the ordinary construction of spring suspensions, the lengthening of the spring is resisted by the inertia of the axle and the unsprung masses connected therewith, this resistance varying and depending upon the speed of compression and the weight of the unsprung masses. This opposition to the lengthening of the spring automatically develops an abnormal stiffness and slowness of response. By bending or curving the extremity of the spring, as at 14, as the vehicle wheel strikes the obstruction or irregularity in the roadway, said curved portion of the spring will yield as above explained and at the same time be flexed in a vertical direction independent of any movement of the spring through the link connection 10 of the lever with the frame and thereby automatically absorbs the shock of encountering the obstruction. As the wheel rides over the obstruction, the load on the spring and the movement of the lever through the link connection 10 will flex the comparatively-flat or bowed portion 14' of the spring, thereby causing an elongation or flattening of the spring leaves, as is obvious from the drawing. This flattening or elongation of the spring leaves causes an increased length of contact support between the spring leaves and lever and thereby shortens the distance between the load and support and permits the use of a spring of comparatively light construction. As the vehicle wheel rides over the obstruction, the axle-carrying end of the lever 7 will move away from the spring, but such movement of the lever is not only limited and retarded by the link 18 but is also softened or absorbed by the friction or tension of the cushioning-roller 19 of the link 18 when the spring leaves tend to flex or bow the comparatively-flat portion 14' thereof. Furthermore, this recoil-arresting link 18 is so arranged and positioned that the spring is normally held under slight compression thereby, thus affording a smoother action of the spring at the beginning of compression under shock than would be the case were the spring not so held. By the arrangement described, the tendency of the vehicle-frame and axle to creep, one relatively to the other, is practically eliminated.

In the form shown in Fig. 4, the lever 7 is fixed at one end to the axle 8 and has a pivotal connection 10 with the vehicle frame 6 at the other end, in a manner similar to that disclosed in Fig. 1. In fact, the spring construction is the same as that shown in Fig. 1, hereinbefore fully described, with the exception that it is reversed; viz., the free ends of the leaves of the spring are curved transversely downwardly instead of upwardly as in Fig. 1, the main leaf $a$ having the fulcrum eye 15 for engagement of the stud 16 secured to the lever 7, to fulcrum the end of said leaf from the lever 7. In this arrangement of Fig. 4, the spring is anchored on the frame 6 by means of a bolt 20 passing through perforations in the spring leaves $a$ and $b$ and threaded into a bracket 21 fixed to the frame in any suitable manner. A spring-clip 22 embraces the spring leaves $a$ and $b$, to prevent displacement of the same, said clip being also secured to the bracket 21 on the frame 6. A recoil-arresting link 23 is likewise utilized, said link being pivotally carried by a bearing member 24 fixed to the vehicle frame 6, said bearing member being provided with laterally-projecting lugs 24', adapted to limit the movement of the link and the link having at its lower end a cushioning-roller 25 of rubber or other suitable material, said link being adapted to embrace the spring leaves and to function as hereinbefore described in connection with the arrangement shown in Fig. 1.

In the construction of the spring, the clamping anchorage or bowed portion having the greatest cross-section may be of standard structure and curvature, while the curved end portion is preferably arranged so that the extremity terminates with the fulcrum eye in a plane which is approximately at right-angles to the plane of said portion of greatest cross-section, with the auxiliary leaf extending to a point approximately at the commencement of the curve of said fulcrum eye of the main leaf and beyond the center thereof.

Having thus described my invention, I claim:

1. In a spring-support for vehicles, the combination with the vehicle frame and axle, of a lever connected at one end to the axle and having a pivotal connection at the opposite end with the vehicle frame, a quarter-elliptical spring having its resilient end curved with the curvature having its tangent terminating approximately at right-angles to the plane of the comparatively-flat portion of the spring, said spring being connected at one end to the lever and anchored at the opposite end to the vehicle frame, and a link pivotally supported by the vehicle frame, said link being adapted to co-operate with said spring to normally hold the same under slight compression and also adapted to arrest and limit the rebound of the spring.

2. In a spring-support for vehicles, the combination with a vehicle-frame and axle, a lever connected at one end to the axle and at its other end to the vehicle-frame, a leaf-spring anchored on the vehicle-frame adjacent the connection on the frame of the lever, said leaf-spring being fulcrumed on said lever near the connection of the lever to the axle, a U-shaped link pivotally attached to the vehicle-frame, said link embracing the leaf-spring and having means adapted to arrest and limit the rebound of said spring, and a cushioning-roller interposed between the link and spring.

In testimony whereof, I affix my signature.

ALBERT F. SHORE.